US010625380B2

(12) United States Patent
Blomfeldt et al.

(10) Patent No.: US 10,625,380 B2
(45) Date of Patent: Apr. 21, 2020

(54) METHOD OF JOINING A FECRAL ALLOY WITH A FENICR ALLOY USING A FILLER METAL BY WELDING

(71) Applicant: SANDVIK INTELECTUAL PROPERTY AB, Sandviken (SE)

(72) Inventors: Thomas Blomfeldt, Solna (SE); Anders Wallero, Enskedadelen (SE); Asa Larsson, Gavle (SE); Anders Wilsson, Gavle (SE)

(73) Assignee: Sandvik Intellectual Property AB, Sandviken (SE)

(*) Notice: Subject to any disclaimer, the term of this patent is extended or adjusted under 35 U.S.C. 154(b) by 271 days.

(21) Appl. No.: 15/738,810

(22) PCT Filed: Jun. 30, 2016

(86) PCT No.: PCT/EP2016/065334
§ 371 (c)(1),
(2) Date: Dec. 21, 2017

(87) PCT Pub. No.: WO2017/001575
PCT Pub. Date: Jan. 5, 2017

(65) Prior Publication Data
US 2018/0178329 A1 Jun. 28, 2018

(30) Foreign Application Priority Data
Jul. 1, 2015 (EP) .................................... 15174789

(51) Int. Cl.
B23K 35/30 (2006.01)
C22C 38/00 (2006.01)
(Continued)

(52) U.S. Cl.
CPC ............ *B23K 35/308* (2013.01); *B23K 31/02* (2013.01); *C22C 1/02* (2013.01); *C22C 38/001* (2013.01);
(Continued)

(58) Field of Classification Search
CPC .. B23K 35/308; B23K 35/3086; B23K 31/02; B23K 31/027; B23K 2103/02;
(Continued)

(56) References Cited

U.S. PATENT DOCUMENTS 3,596,053 A * 7/1971 Kameda ................... B23K 9/23
219/136
3,881,912 A * 5/1975 Mikurak ............ B23K 35/0255
75/255

(Continued)

FOREIGN PATENT DOCUMENTS

EP 2787096 A1 10/2014
JP H04197581 A 7/1992
(Continued)

Primary Examiner — Patrick M. Buechner
(74) Attorney, Agent, or Firm — Morgan, Lewis & Bockius LLP

(57) ABSTRACT

The present disclosure relates to a method which uses welding in order to join a FeCrAl alloy to a FeNiCr alloy by using a specific filler metal. The present disclosure also relates to a product obtained thereof. Further, the present disclosure relates to the use of the method, especially in high temperature applications.

12 Claims, 4 Drawing Sheets

(51) Int. Cl.
*C22C 38/02* (2006.01)
*C22C 38/04* (2006.01)
*C22C 1/02* (2006.01)
*C22C 38/26* (2006.01)
*C22C 38/44* (2006.01)
*C22C 38/52* (2006.01)
*C22C 38/48* (2006.01)
*C22C 38/50* (2006.01)
*C22C 38/28* (2006.01)
*C22C 38/06* (2006.01)
*B23K 31/02* (2006.01)
*B23K 103/02* (2006.01)

(52) U.S. Cl.
CPC .............. *C22C 38/02* (2013.01); *C22C 38/04* (2013.01); *C22C 38/06* (2013.01); *C22C 38/26* (2013.01); *C22C 38/28* (2013.01); *C22C 38/44* (2013.01); *C22C 38/48* (2013.01); *C22C 38/50* (2013.01); *C22C 38/52* (2013.01); *B23K 2103/02* (2018.08)

(58) Field of Classification Search
CPC ............ B23K 2103/00; B23K 2103/04; B23K 2103/05; C22C 38/02; C22C 38/04; C22C 1/02; C22C 38/26; C22C 38/44; C22C 38/52; C22C 38/48; C22C 38/50; C22C 38/28; C22C 38/06
See application file for complete search history.

(56) References Cited

U.S. PATENT DOCUMENTS

| | | | | |
|---|---|---|---|---|
| 4,426,426 A | * | 1/1984 | Muhlberger | B23K 35/3066 164/96 |
| 4,439,498 A | * | 3/1984 | Sadowski | B23K 35/3066 219/136 |
| 5,304,346 A | * | 4/1994 | O'Donnell | B23K 35/3605 148/23 |
| 5,725,693 A | * | 3/1998 | Santella | B23K 35/304 148/428 |
| 7,562,807 B2 | * | 7/2009 | Coleman | B23K 35/3033 228/262.41 |
| 7,755,001 B2 | * | 7/2010 | Nakajima | C22C 19/058 219/137 WM |
| 8,021,604 B2 | * | 9/2011 | Kelly | B22F 3/225 219/146.1 |
| 10,065,272 B2 | * | 9/2018 | Jeong | B23K 35/3053 |
| 2003/0140986 A1 | * | 7/2003 | Hirata | C21D 6/002 148/325 |
| 2003/0196997 A1 | * | 10/2003 | Watanabe | B23K 35/3608 219/145.22 |
| 2006/0163231 A1 | | 7/2006 | Kobayashi et al. | |
| 2009/0158889 A1 | * | 6/2009 | Kodama | B23K 35/3086 75/302 |
| 2009/0196783 A1 | * | 8/2009 | Osuki | B23K 35/3053 420/40 |
| 2009/0305078 A1 | * | 12/2009 | Sjodin | B23K 35/3053 428/656 |
| 2010/0055495 A1 | * | 3/2010 | Sjodin | B23K 35/3053 428/682 |
| 2010/0062279 A1 | * | 3/2010 | Osuki | B23K 35/3053 428/683 |
| 2011/0253691 A1 | * | 10/2011 | Kodama | B23K 9/23 219/137 R |
| 2012/0118936 A1 | * | 5/2012 | Ikeda | B23K 35/0261 228/56.3 |
| 2015/0275342 A1 | * | 10/2015 | Ishii | C21D 9/46 420/61 |
| 2016/0144463 A1 | * | 5/2016 | Hellsten | B23K 35/30 420/54 |
| 2017/0157692 A1 | * | 6/2017 | Kozak | B23K 9/0035 |
| 2019/0264307 A1 | * | 8/2019 | Yamamoto | C21D 8/0273 |

FOREIGN PATENT DOCUMENTS

| | | |
|---|---|---|
| JP | 2009012070 A | 1/2009 |
| RU | 2212991 C2 | 9/2003 |
| WO | 2014204388 A1 | 12/2014 |

* cited by examiner

Figure 1A and B
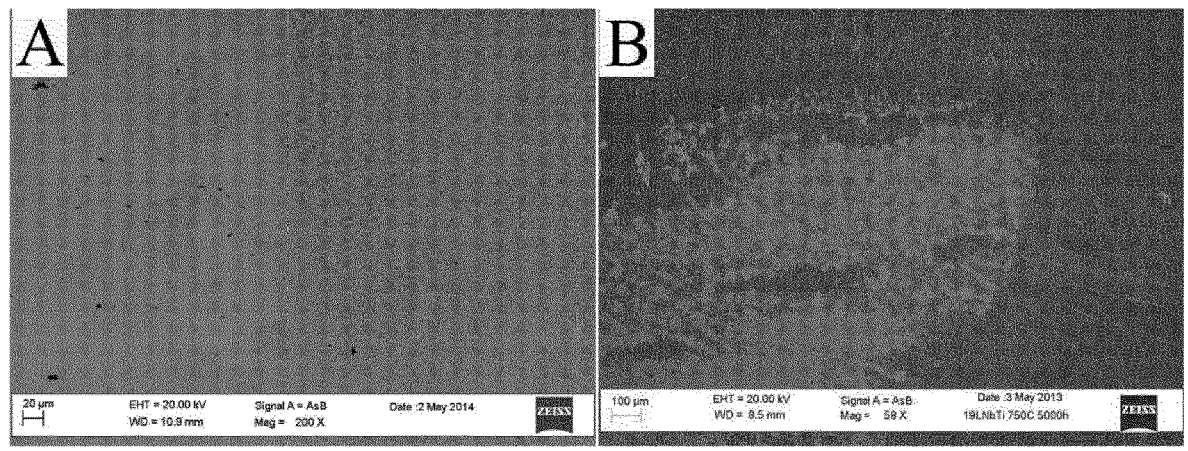

METHOD OF JOINING A FECRAL ALLOY WITH A FENICR ALLOY USING A FILLER METAL BY WELDING

RELATED APPLICATION DATA

This application is a § 371 National Stage Application of PCT International Application No. PCT/EP2016/065334 filed Jun. 30, 2016 claiming priority to EP 15174789.6 filed Jul. 1, 2015.

TECHNICAL FIELD

The present disclosure relates to a method which uses welding in order to join a FeCrAl alloy to a FeNiCr alloy by using a specific filler metal. The present disclosure also relates to a product obtained thereof. Further, the present disclosure relates to the use of products obtained by said method, especially in high temperature applications.

BACKGROUND ART

In many industrial processes, there are high temperatures and adverse atmospheres. In this environment, materials may oxidize or corrode rapidly and/or creep. One example of such an environment is the process of thermal cracking for obtaining ethylene for polymer manufacturing. This requires great demands on corrosion resistance and high-temperature strength of the materials used. In this process, it is a goal to increase the service life of the material in order to decrease the number of maintenance shutdowns and expensive repairs. It is also a goal to raise the temperature in the manufacturing process in order to increase productivity.

One material used for high-temperature applications is ferritic iron-chromium-aluminum (FeCrAl) alloys. In many cases when a FeCrAl alloy is used as construction material, it has to be joined to another high-temperature material, which is often an austenitic stainless steel, such as a FeNiCr alloy. However, there are challenges joining these two materials by welding because of the differences in the material chemistry which causes difficulties formation of intermetallic phases, which will impair the mechanical properties of the weld.

WO 2014/204388 A1 discloses a filler for welding comprising (in % by weight): C: ≤0.036, Ni: 15.0-20.0, Cr: 15.0-22.0, Mn: 0.75-2.0, Zr: 0.1-1.45, Si: 0-1.5, Al: 0-2, N: <0.06 and a balance of Fe and inevitable impurities.

US 2006/163231 A1 discloses ferritic stainless steel welding wire consisting essentially of, by mass, 0.03% or less C, 3% or less Si, 3% or less Mn, 2% or less Ni, 11 to 20% Cr, 3% or less Mo, 1% or less Co, 2% or less Cu, 0.02 to 2.0% Al, 0.2 to 1.0% Ti, 0.02% or less O, 0.04% or less N, and at least one of Nb and Ta, the mass % thereof being eight times the total mass percent of said C and said N to 1.0 mass %, the balance being Fe and unavoidable impurities.

It is therefore of great importance to minimize and/or eliminate the formation of brittle intermediate phases formed during welding, especially when the objects to be joined are used in high temperature applications. It is also important to avoid the formation of a continuous film of brittle precipitations in the weld as this also will reduce the mechanical properties of the weld.

Thus, one aspect of the present disclosure is to provide a method of joining a FeCrAl alloy to FeNiCr alloy by welding in which at least one of the above problems is reduced or avoided.

BRIEF DESCRIPTION OF DRAWINGS

FIGS. 1A and B discloses the microstructure for a welded sample aged for 5000 h at 750° C. FIG. 1A is a FeNiCr-metal filler and FIG. 1B) is a FeCrAl-metal filler.

FIG. 2A) shows at room temperature (RT) and FIG. 2B) at 750° C.

DEFINITIONS

Figure 2A:
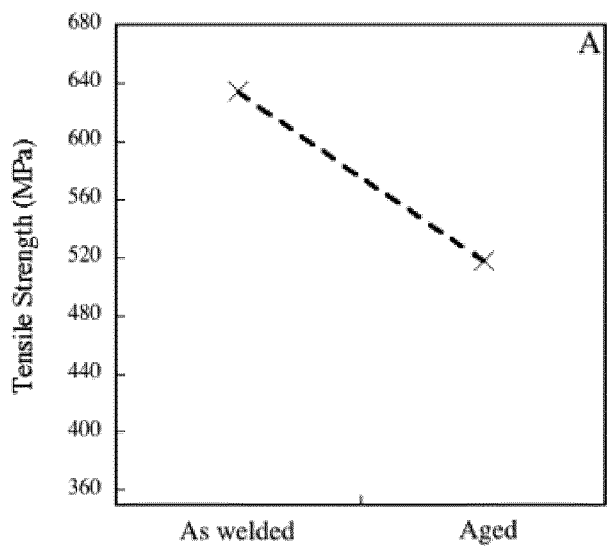
FIGS. 2A and B discloses the tensile strength for FeNiCr-metal filler-FeCrAl as welded and as aged at 750° C. for 5000 h.

In the present disclosure, the term "FeCrAl", is intended to mean FeCrAl alloys having chromium content of above 11 wt %, an aluminum content of more than 4 wt % and the balance is Fe (and unavoidable impurities). These stainless steels have a ferritic microstructure and will also form a protective layer of aluminum oxide on the surface of an object comprising said alloys. These alloys may also contain a large content of molybdenum.

In the present disclosure, the term "FeNiCr" is intended to mean FeNiCr alloys having a chromium content of above 11 wt %, a nickel content of between 20-60 wt % and a balance of Fe (and unavoidable impurities). These FeNiCr stainless steel alloys, including iron-base and nickel-base alloys always have austenitic microstructure and will form a protective layer of chromium oxide on the surface of objects comprising said alloys.

In the present disclosure, the terms "wt %", "weight %" or "%" are used interchangeably and means weight percent.

DETAILED DESCRIPTION

The present disclosure provides a method of joining two different alloys by using a specific kind of filler metal. The present disclosure therefore provides a method of joining a FeCrAl alloy to a FeNiCr alloy by welding using a filler metal, wherein the filler metal comprises (wt %):

| | |
|---|---|
| C | 0.01 to 0.1; |
| Si | less than or equal to 1.5; |
| Mn | less than or equal to 2.0; |
| Cr | 14.0 to 27.0; |
| Ni | less than or equal to 2; |
| Mo | less than or equal to 1.5; |
| V | less than or equal to 0.35; |
| Ti and/or Zr | 0.4 to 1.0; |
| Al | less than or equal to 0.7; |
| Nb | 0.3 to 1.5; |
| N | less than or equal to 0.02; |
| and balance of Fe and unavoidable impurities. | |

Hence, the method as defined hereinabove or hereinafter is based on the finding that it is possible to join two or more alloys having different material chemistry by welding using filler metal as defined hereinabove or hereinafter, said filler metal comprises controlled amounts of N, Al, and Ni in combination with controlled amounts of C, Nb, Ti and/or Zr.

The different alloys, i.e. the FeCrAl alloy and the FeNiCr alloy, may be in the form of a tube and or a strip and the filler metal may, for example, be provided in a form of strip or wire, which strip or wire are suitable for be used in welding applications.

In particular, the method as defined hereinabove or hereinafter is suitable for joining a FeCrAl alloy to a FeNiCr alloy and the obtained product (the terms object and product will be interchangeably used herein) will have good creep strength as well as good corrosion resistance at high temperatures. Thus, the obtained product is suitable to use in high temperature applications, i.e. at temperatures which are 650° C. or higher. However, the product may also be used for other applications wherein good creep strength and good corrosion resistance is required.

This, the present method will provide a weld wherein the effect of the initially mentioned brittle phases is avoided or at least minimized. Also, the product obtained by the method as defined hereinabove or hereinafter no continuous film of brittle precipitations, which means that if said product is use in plants which are run at high temperatures, the service life of the parts made of said product will be increased, thus decreasing the number of maintenance shutdowns.

Also, the method as defined hereinabove and hereinafter will provide a product having sufficient mechanical strength, such as tensile strength, ultimate tensile elongation and ductility over time, which is especially useful when said product is used in high temperature applications, i.e. a temperatures above 650° C. The present disclosure therefore relates to an object comprising at least one FeCrAl alloy and at least FeNiCr alloy which are joined together with a filler metal having the composition as defined hereinabove or hereinafter. Furthermore, the present disclosure also provides for parts made of said objects which are to be used in plants or parts of plants which are run at high temperatures.

The alloying elements of the filler metal according to the present disclosure will now be described.

Carbon (C): 0.01 to 0.10 wt %

C has a positive effect of increasing the creep strength as it will form carbides with Ti, Zr and Nb. However, too high concentration of carbon may reduce the corrosion and oxidation properties. Accordingly, the carbon content is of from 0.01-0.10 wt %, such as of from 0.01-0.08 wt %.

Silicon (Si): Less or Equal to 1.5 wt %

Si reduces the oxygen content and has a positive effect on the fluidity of the weld pool. Silicon has also a positive effect against carburization. However, too high content of Si will increase the tendency for precipitation of intermetallic phases. Accordingly, the Si content is less than or equal to 1.5 wt %, such as of from 0.01 to 1.5 wt %.

Manganese (Mn): Less or Equal to 2.0 wt %

Mn has a positive impact on the hot ductility by fixing sulphur. However, too high content of Mn may cause embrittlement of the obtained weld. Accordingly, the Mn content is set to be at less than or equal to 2 wt %.

Chromium (Cr): 14.0-27.0 wt %

Cr improves corrosion and oxidation properties of the weld. However, too high content of Cr will stabilize the sigma phase, which result in a brittle material. The Cr content should therefore be limited to 27.0% by weight. A too low Cr content will reduce the corrosion resistance. Hence, the content of Cr is of from 14.0 to 27.0 wt %, such as of from 18.0-23.0 wt % in the filler metal.

Nickel (Ni): Less than or Equal to 2.0 wt %

The Ni content is kept as low as possible in the filler metal since Ni may increase the formation of brittle phases, such as nickel-aluminides. The brittle phases will weaken the strength of weld as a continuous film of nickel-aluminides will be formed. However, a low amount of nickel-aluminides will have a positive effect on the creep strength of the weld. Hence, the content of Ni is less than or equal to 2.0 wt %, such as less than or equal to 1.0 wt %, such as less than or equal to 0.5 wt %, such as less than or equal to 0.25 wt %, such as less than or equal to 0.1 wt %, such as 0 wt %.

Molybdenum (Mo): Less than or Equal to 1.5 wt %

Mo improves the creep properties and also stabilizes the brittle sigma phase. However, too high content of Mo will increase the formation of intermetallic phases. Hence, Mo content is set to be at less than or equal to 1.5 wt %, such as less than or equal to 0.3 wt %.

Vanadium (V): Less than or Equal to 0.35 wt %

Vanadium forms carbides that improve the creep properties and reduce the risk of forming chromium carbides. However, too high content of V may cause coarse carbide precipitates to be formed which will reduce the mechanical strength of the weld. Accordingly, the V content is set to be at less than or equal to 0.35 wt %, such as less than or equal to 0.25 wt % in the filler metal.

Aluminum (Al): Less than or Equal to 0.7 wt %

Aluminum is kept low in order to reduce the formation of nickel aluminides and aluminum nitrides in the weld as but high concentration of these precipitates may result in brittle failure of the weld. However, a small concentration of nickel aluminides or aluminum nitrides may have a positive effect on the creep strength. Therefore, the Al content is set to be at 0.7 wt %, such as less than 0.5 wt %, such as less than 0.25 wt % in the filler metal.

Titanium and/or Zirconium (Ti and/or Zr): 0.4 to 1.0 wt %

Ti and Zr may be used equivalently and will form carbides that improve the creep properties and reduce the risk of forming chromium carbides. However, too high content of Ti and/or Zr will cause the formation of coarse precipitates which will reduce the mechanical properties of the weld. Hence, the content of Ti and/or Zr is of from 0.4 to 1.0 wt %, such as of from 0.5 to 1.0 wt %.

Niobium (Nb): 0.3 to 1.5 wt %

Niobium forms carbides that improve the creep properties and reduce the risk of forming chromium carbides. However, too high content of Nb will cause the formation of coarse precipitates which will reduce the mechanical properties of the weld. Accordingly, the content of Nb is of from 0.3 to 1.5 wt %, such as of from 0.3 to 1.0 wt %.

Nitrogen (N): less than or equal to 0.02 wt % Nitrogen should be kept as low as possible in the filler metal, since it gives rise to brittle phases such as aluminum nitrides. The content of nitrogen is therefore less than or equal to 0.02 wt %, such as less than or equal to 0.015 wt %.

The balance is iron (Fe) and unavoidable impurities.

The minimization of Ni, Al and N in the filler metal will result in that the presence of aluminium nitrides (AlN) as well as nickel aluminide ($Ni_xAl$) in the obtained weld i minimized or even eliminated. Furthermore, there will be no continuous film of precipitates formed in the weld. The minimization of the formation of intermetallic phases will have a positive impact on the mechanical properties of the welded joint. The lack or low presence of both AlN and $Ni_xAl$ in the weld is, without being bound to any theory, assumed to depend on the composition of filler metal wherein the content of Ni, Al and N is minimized.

The present disclosure is further illustrated by the following non-limiting example.

EXAMPLE

A FeCrAl-alloy was joined to a FeNiCr-alloy using a filler metal. TIG (tungsten inert gas) was used as a welding method.

The FeCrAl-alloy used in this example was Kanthal® APMT, the FeNiCr-alloy used was an Alloy 800HT obtained from Sandvik Materials Technology AB (hereinafter referred to as Sandvik steel grade Sanicro™ 31HT) and the filler metal used was the Sandvik® 19.LNbTi welding wire. The FeCrAl-alloy and the FeNiCr-alloy were in the form of tubes. The compositions of the different materials are found in table 1 (the compositions have been obtained from the product sheets of respective alloy):

TABLE 1

Chemical composition of the alloys (Kanthal ® APMT and Sanicro ™ 31HT) and the filler material used (Sandvik ® 19.LNbTi)

| Alloy | Cr | Ni | Si | Mo | Al | Nb | Co | Mn | C | N | Ti |
|---|---|---|---|---|---|---|---|---|---|---|---|
| Kanthal ® APMT | 21 | 0.1 | 0.5 | 3 | 5 | — | — | 0.1 | 0.034 | 0.035 | — |
| Sanicro ™ 31HT | 20.3 | 30.3 | 0.52 | 0.13 | 0.5 | — | — | 0.5 | 0.07 | 0.013 | 0.5 |
| Sandvik ® 19.LNbTi | 18.9 | 0.18 | 0.8 | 0.025 | — | 0.4 | 0.022 | 0.42 | 0.013 | 0.012 | 0.5 |

The compositions are balanced with Fe and unavoidable impurities.

The alloys were joined using TIG method according to the welding parameters shown in table 2.

TABLE 2

Welding parameters used for the joining of Kanthal ® APMT and Sanicro ™ 31HT using 19.LNbTi as filler metal by TIG welding method.

| | |
|---|---|
| Shielding gas composition | Ar (99.99%) |
| Flow rate (l/min) | 8-10 |
| Backing gas composition | Ar (99.99%) |
| Flow rate (l/min) | 8-12 |
| Pre-heat temperature (° C.) | 250-300 |
| Interpass temperature (° C.) | 250-300 |
| Post weld heat treatment (° C.)/hold time (min) | 850 ± 20/30 |
| Cooling rate to ambient temperature (° C./h) | ≥100 |
| Heat input (kJ/mm) | <1.0 |

The tubes were pre-heated to a temperature of between 250-300° C. and TIG welded at a temperature between 250-300° C. with argon (99.99%) as both shield and backing gas. After welding, the obtained weld was subjected to a post-weld heat treatment at a temperature of 850° C.±20° C. for 30 minutes, before being slowly cooled down to an ambient temperature at a rate of at least 100° C./h.

Samples of the weld were aged at 750° C. for 5000 h, before being characterized microstructural and evaluated mechanically.

The microstructural characterization after ageing showed that both Kanthal® APMT and Sanicro™ 31HT had no continuous film of precipitations along their fusion line to the metal filler, see FIGS. 1 A and B. However, small precipitated particles of nickel aluminates (FIG. 1A dark spots) and sigma phase could be found along the fusion line to the Kanthal® APMT. Aluminum nitrides together with precipitations containing Ti and Nb, both small amounts, could be found in the fusion line to Sanicro™ 31HT (FIG. 1B dark spots). Small amount of precipitations is acceptable. However, if a continuous film of precipitates is formed, integrity of the joint will be affected, especially during thermal cycling.

Mechanical Properties

Figure 2B:
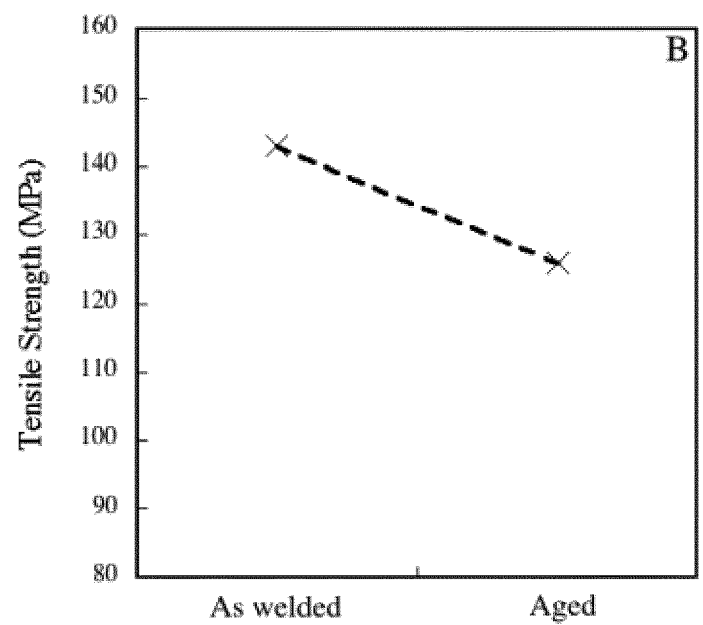

FIGS. 2A and 2B show the difference in tensile strength for as-welded and aged (750° C. for 5000 h) samples of Kanthal® APMT and Sanicro™ 31HT welded with the Sandvik @ 19.LNbTi filler metal. FIG. 2A shows the difference at room temperature and FIG. 2B shows the difference at 750° C.

As can be seen from the figures, the ageing affected the tensile strength of the weld; however as can be seen the mechanical strength of the weld is still sufficient for high temperature application (over time). Furthermore, as both the as-welded and aged samples had an elongation between 20-25% at 750° C., this means that both welds had good ductility.

Figure 3:
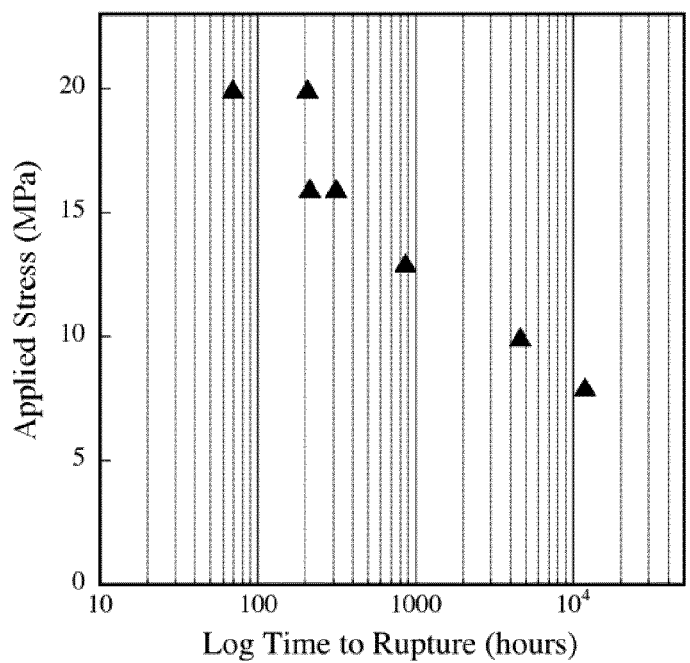
FIG. 3 discloses the applied stress on rupture time at 816° C.

FIG. 3 shows the influence of applied stress on creep rupture time at 816° C. (1500 F) for Kanthal® APMT and Sanicro™ 31HT welded with 19.LNbTi. The creep fractures are located in the weld and not along either of the fusion lines. This indicates the non-presence of precipitations along the fusion line and that the obtained product has good ductility. This also shows that the creep rupture is controlled by the strength of the filler metal and not influenced by the formation of any brittle precipitation along the fusion line. Furthermore, the good ductility of the weld shows the advantage of selecting a filler metal with a low content of aluminum, nickel and nitrogen for the joining of a FeCrAl alloy with FeNiCr alloy.

Figure 4:
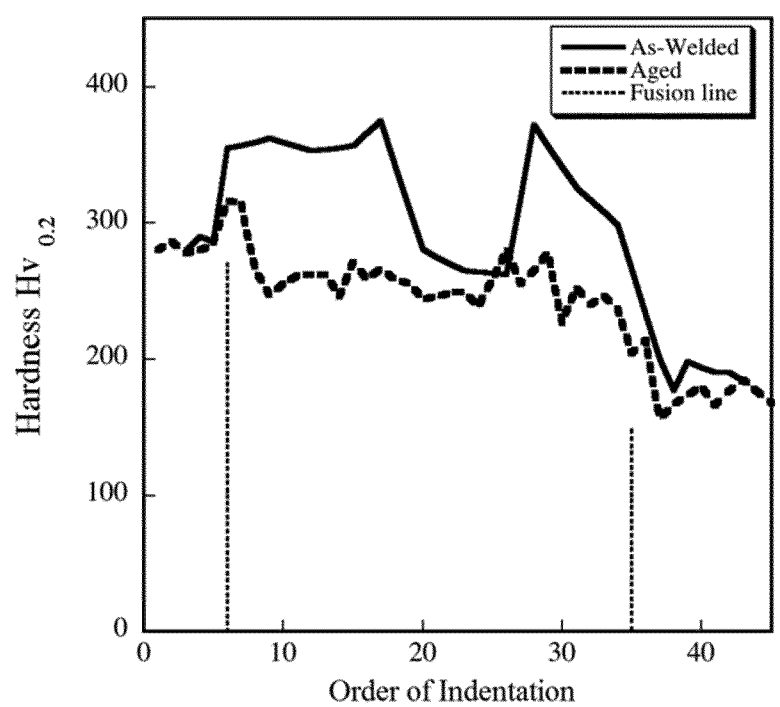
FIG. 4 discloses a Hardness test at 816° C. for FeCrAl-metal filler-FeNiCr.

FIG. 4 shows the difference in hardness profile measured in $Hv_{0.2}$ over the weld of the as-welded and aged samples. The measurements were performed along the centerline of the tube walls. Kanthal® APMT is located on the left region of the chart while Sanicro™ 31HT is located on the right region of the chart fusion lines. The filler metal is located between the fusion lines in the chart. There are no major hardness peaks. The minor hardness increase on both sides of the weld in the as welded condition is smoothed down by aging. This shows that no continuous films of precipitates are formed in either of the fusion lines, since an increase in hardness will be-expected at the fusion line in the presence of precipitates.

CONCLUSION

Thus, the results show that the selection of the composition of filler metal is of fundamental importance and that the weld obtained had very good mechanical properties, i.e. very good tensile strength, very good ductility and very good creep rupture time at high temperatures.

The invention claimed is:

1. A method of joining a FeCrAl alloy to a FeNiCr alloy by welding using a filler metal, wherein the filler metal comprises in weight % (wt %):

| | |
|---|---|
| C | 0.01 to 0.1; |
| Si | less than or equal to 1.5; |
| Mn | less than or equal to 2.0; |
| Cr | 14.0-27.0; |
| Ni | less than or equal to 2.0; |
| Mo | less than or equal to 1.5; |

-continued

| | |
|---|---|
| V | less than or equal to 0.35; |
| Ti and/or Zr | 0.4 to 1.0; |
| Al | less than or equal to 0.7; |
| Nb | 0.3 to 1.5; |
| N | less than or equal to 0.02; and |
| a balance of Fe and inevitable impurities. | |

2. The method according to claim 1, wherein the filler metal comprises a content of N that is less than or equal to 0.015 wt %.

3. The method according to claim 1, wherein the filler metal includes a content of Al that is less than or equal to 0.5 wt %.

4. The method according to claim 1, wherein the filler metal includes a content of Ni that is less than or equal to 0.25 wt %.

5. The method according to claim 1, wherein the filler metal includes a content of Cr that is of from 18.0 to 23.0 wt %.

6. The method according to claim 1, wherein the filler metal includes a content of C that is of from 0.01-0.08 wt %.

7. The method according to claim 1, wherein the filler metal includes a content of Ti and/or Zr that is of from 0.5 to 1.0 wt %.

8. The method according to claim 1, wherein the filler metal includes a content of Nb that is of from 0.3 to 1.0 wt %.

9. The method according to claim 1, wherein the FeCrAl alloy and the FeNiCr alloy are in the form of a tube and or a strip.

10. The method according to claim 1, wherein the filler metal is in the form of a wire or a strip.

11. An object comprising at least one FeCrAl alloy and at least FeNiCr alloy which are joined together with a filler metal having the composition according to claim 1.

12. The object according to claim 11, wherein the object is a part in a manufacturing plant, and wherein the object is exposed to a temperature that is more than or equal to 650° C.

* * * * *